United States Patent [19]
Tsay

[11] Patent Number: 5,822,920
[45] Date of Patent: Oct. 20, 1998

[54] NURSERY DEVICE

[76] Inventor: Chaur-Ji Tsay, No. 160, Shu Hsin Rd., Shu Lin Chen, Taipei Hsien, Taiwan

[21] Appl. No.: 887,716

[22] Filed: Jul. 3, 1997

[51] Int. Cl.$^6$ ..................................................... A01G 31/00
[52] U.S. Cl. ..................................................... 47/61; 47/60
[58] Field of Search ................................ 111/200; 47/60, 47/61

[56] References Cited

U.S. PATENT DOCUMENTS 4,487,164  12/1984  Yanagisawa .......................... 47/61 X
5,592,775  1/1997  Dew ..................................... 47/61

Primary Examiner—Michael J. Carone
Assistant Examiner—Christopher J. Novosad
Attorney, Agent, or Firm—Kolisch Hartwell Dickinson McCormack & Heuser

[57] ABSTRACT

A nursery device is able to provide excellent drainage effect to incubate spear therein. The device features that a beveled bottom face provided therewith enables to direct water therein to flow from one end to another and eventually the water will flow out via a drainage hole defined in the beveled bottom face and openings defined in a bottom edge of the device.

3 Claims, 4 Drawing Sheets

NURSERY DEVICE

FIELD OF THE INVENTION

The present invention generally relates to a nursery device, and more particularly to a nursery device which is able to provide necessary water to spear nursed therein and also provides excellent drainage to avoid putrescence of the spear.

BACKGROUND OF THE INVENTION

It is well known that all kinds of grains, vegetables and beans will have spear right after they are nursed and because all spear enriches in enzyme, vitamins, minerals and active protein, people enjoy using spear as a dish to keep their physical condition in good shape. Therefore, because of the high nutrition of spear, incubation of the spear is popularly spreaded throughout the world. However, an important factor in incubation of the spear is that keeping the spear in perfect clean condition is necessary, otherwise contaminated or polluted portions will have to be abandoned. Based on the reason set forth, water-incubation seems to be the best way to keep the whole nutrition of the spear and from pollution by the soil.

In order to have a clean environment to incubate the spear, a transparent spherical incubator is introduced to the market. Such incubator enables a user to water the spear periodically and afterward, the water will be slowly drained out from an outlet provided at a bottom of the incubator. Before the next watering, the water will be kept within the incubator, so the spear will substantially be soaked in water for a period of time. It is common sense that when the spear is nursed, the spear will let out heat. The heat will then be absorbed by the still water within the spherical incubator, which will increase putrescence of the spear. Therefore, a good incubator should be able to take the heat away to avoid any damage to the spear.

From the previous description, A nursery device which is able to provide sufficient water and good drainage structure to spear nursed within the device and constructed in accordance with the present invention tends to mitigate and/or obviate the aforementioned problems.

SUMMARY OF THE INVENTION

The main objective of the invention is to provide a nursery device for spear. The device is provided with a beveled bottom face which has a wave-like shape, so that when watering the spear, the water will be able to be directed to flow along troughs between every two ridges, and eventually, the water will be drained out from an outlet defined in a lowest area of the bottom face.

According to one aspect of the invention, the invention includes a cover having an undulated face, a peripheral first flange securely and peripherally engaged with the undulated face and a through hole defined within the undulated face and an incubator having a peripheral second flange corresponding to the first flange of the cover such that the cover and the incubator is able to mate with each other, a wave-like and beveled bottom face and a number of pairs of tracks opposingly defined in a side wall thereof for receiving clapboards therein.

Other objects, advantages and novel features of the invention will become more apparent from the following detailed description when taken in conjunction with the accompanying drawings.

BRIEF DESCRIPTION OF THE DRAWINGS

The present invention will now be better understood with reference of the accompanying drawings wherein.

DETAILED DESCRIPTION OF THE PREFERRED EMBODIMENT

Figure 1:
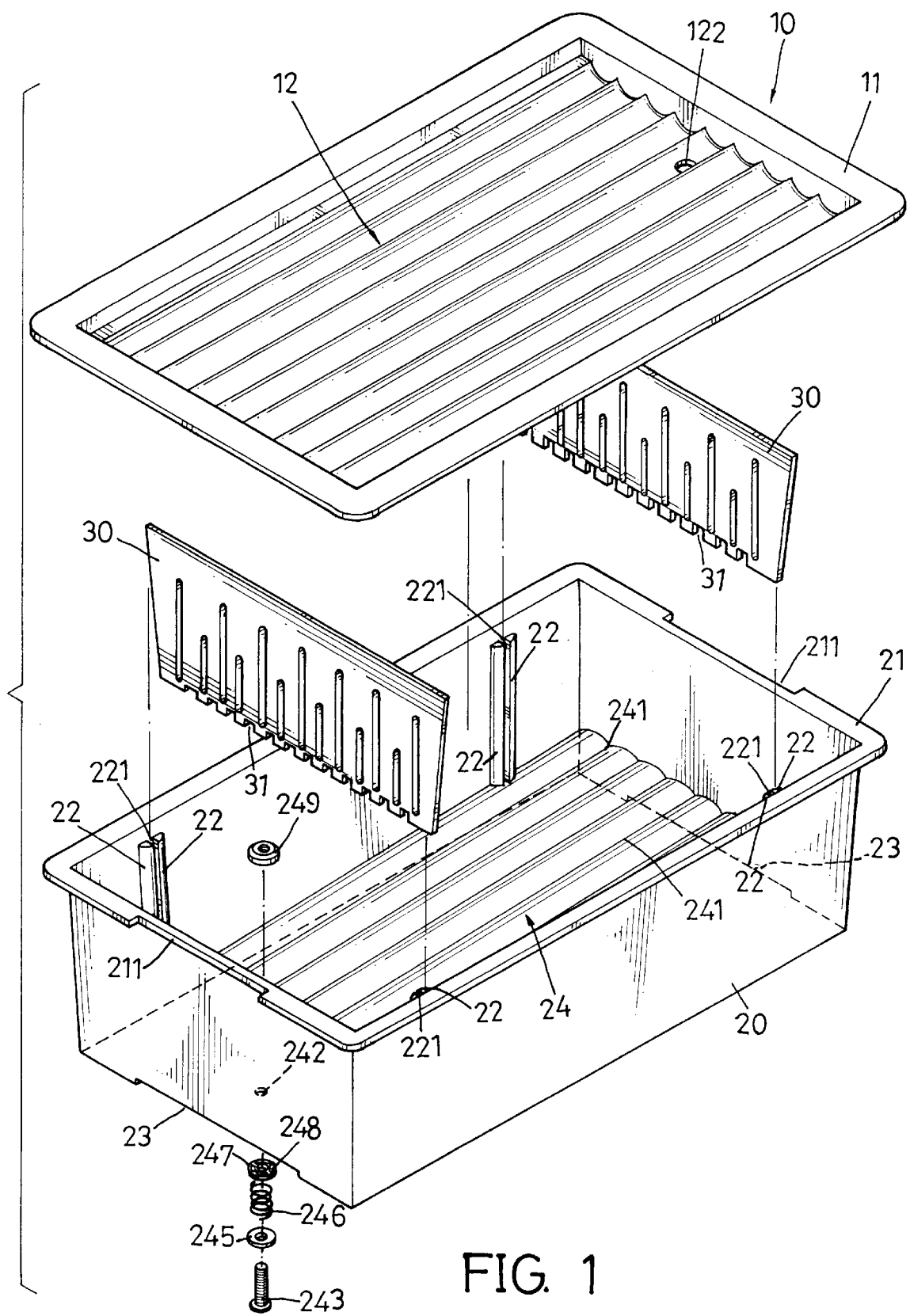
FIG. 1 is an exploded view of the invention.
Figure 3:
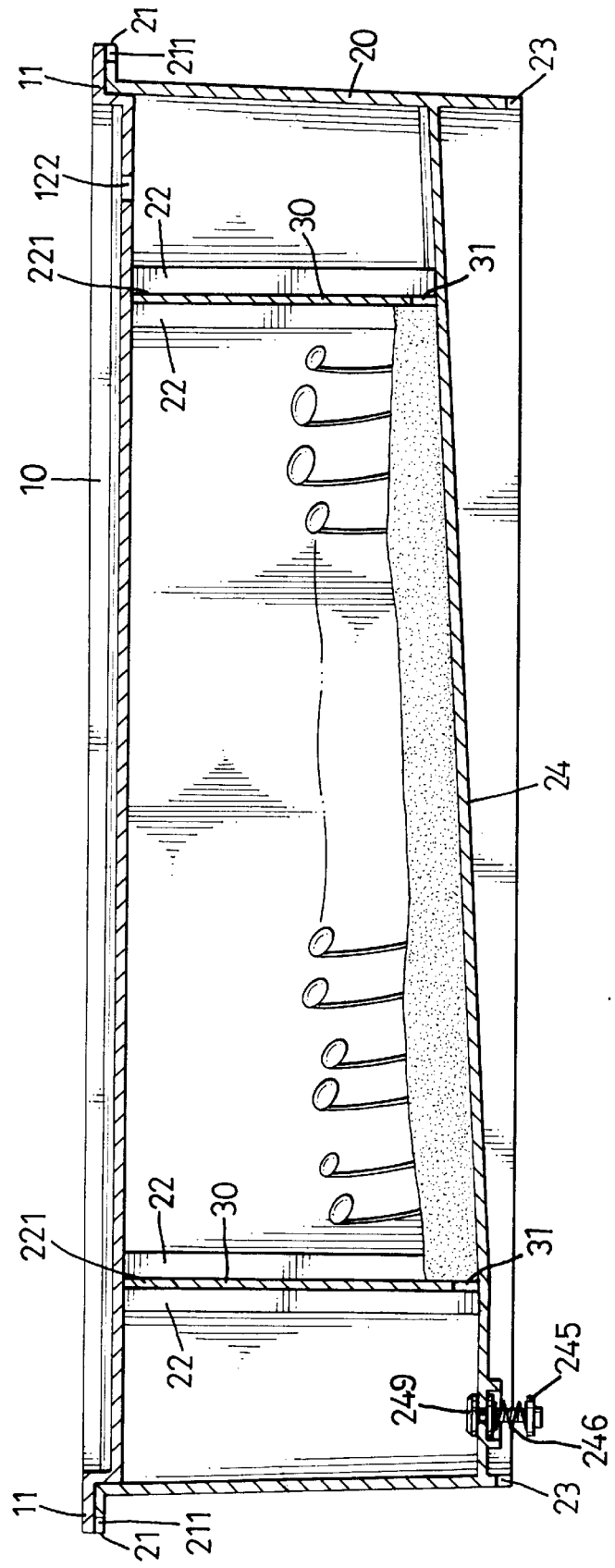
FIG. 3 is a schematic view showing the incubation of spear within an incubator shown is partial cross section.

Referring to FIG. 1, one preferred embodiment of a device for nursing spear and constructed in accordance with the present invention is shown. The device includes a cover 10 having an undulated face 12, a peripheral first flange 11 securely and peripherally engaged with the face 12 and a through hole 122 defined within the face 12, an incubator 20 having a peripheral second flange 21, a beveled and wave-like bottom face 24. The peripheral second flange 21 has two opposingly positioned cutouts 211 each defined in the peripheral second flange 21 enabling a user to open the cover 10 easily. A plurality of pairs of bars 22 are securely formed or opposing walls of the incubator 20 and each pair of bars 22 defines therebetween a slit 221, such that a plurality of clapboards 30 are able to be inserted between one opposed pair of slits 221 to divide an inner space of the incubator 20 into several areas. It shows that two opposingly spaced pairs of bars 22 are used in this preferred embodiment and thus four slits 221 are defined to receive two clapboards 30 in two opposed slits 221 to divide the inner space of the incubator 20 into three areas. Due to the provision of the wave-like beveled bottom face 24, a plurality of troughs 241 each are thus defined between every two ridges (not numbered). Two openings 23 are defined in two opposed bottom edges and along a longitudinal direction of the slope of the beveled bottom face 24 of the incubator 20 to enhance the drainage effect. Furthermore, FIGS. 1 and 3 show that the incubator 20 still has a horizontal area C and a drainage hole 242 is defined therein, so that the water flowing down from the beveled bottom face 24 will eventually flow to the drainage hole 242 and the opening 23 to be drained out of the incubator 20.

Figure 2:
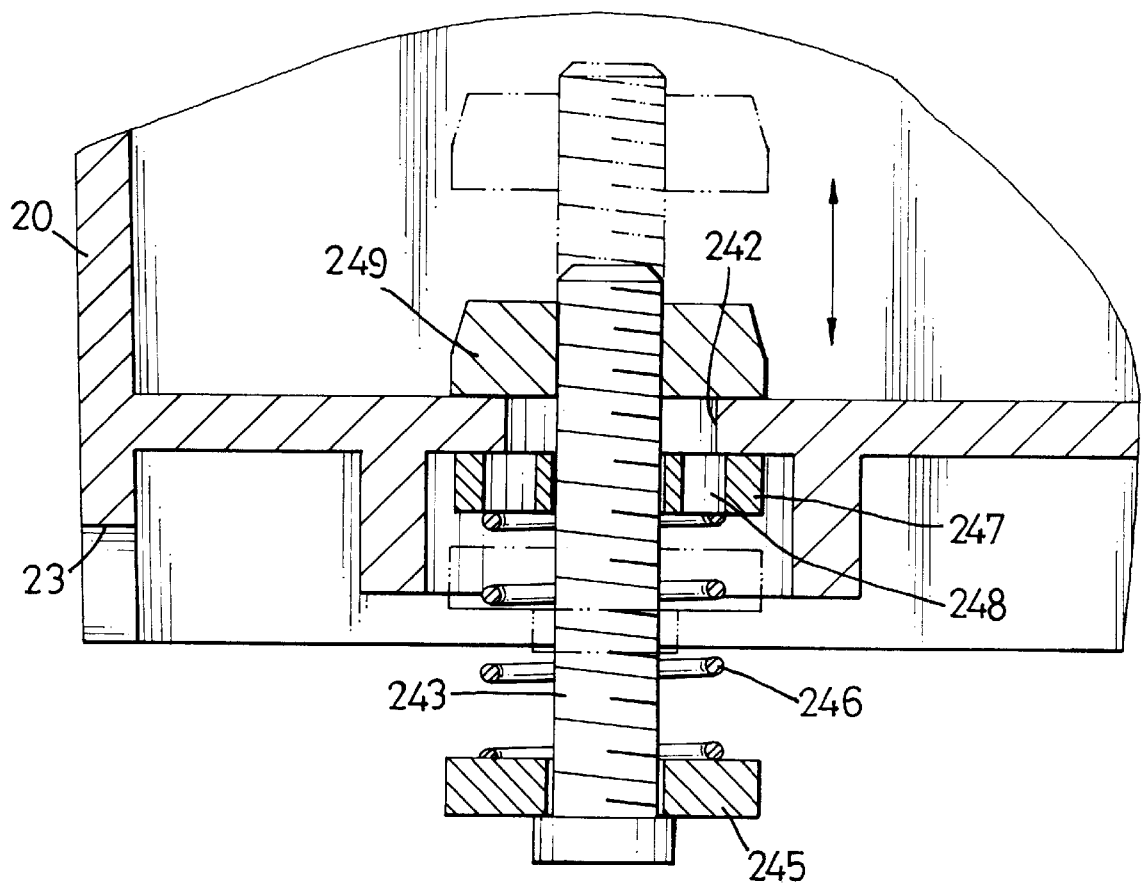
FIG. 2 is an enlargement cross sectional view of a portion of the invention.

Referring to FIG. 2, a bolt 243 is inserted into the drainage hole 242 from outside of the incubator 20 after first being sequentially inserted into a washer 245, a spring 246, and a stop 247 which defines therein a plurality of outlets 248A block 249 then is adjustably secured to a shank (not numbered) of the bolt 243. Diameters of both the block 249 and the washer 245 are bigger than that of a diameter of the drainage hole 242 and a diameter of the spring 246 is larger than that of the diameter of the drainage hole 242 and a diameter of the stop 247 is large than the diameter of the drainage hole 242, such that the stop 247 will be securely held adjacent the drainage hole 242. Due to the diameter of the block 249 and the washer 245 being bigger than the diameter of the drainage hole 242, both the block 249 and the washer 245 are excluded out side the drainage hole 242 and the spring 246 is thus positioned between the stop 247 and the washer 245. With such a structure, as shown in FIGS. 2 and 3, when the incubator 20 is placed on a horizontal plane, the bolt 243 will be pressed into the drainage hole 242, thus the block 249 will leave the drainage hole 242 open and thus the water within the incubator 20 is able to drained out from the opening 23 via the outlets 248 of the stop 247. When the incubator 20 is being transportated, due to the recovery force of the spring 246, the block 249 will again block the drainage hole 242 and the water within the incubator 20 will be able to be preserved during a trip.

The clapboard 30 has a plurality of indentations 31 defined in a bottom edge thereof such that water is able to flow out of the incubator 20 even smoother.

Figure 4:
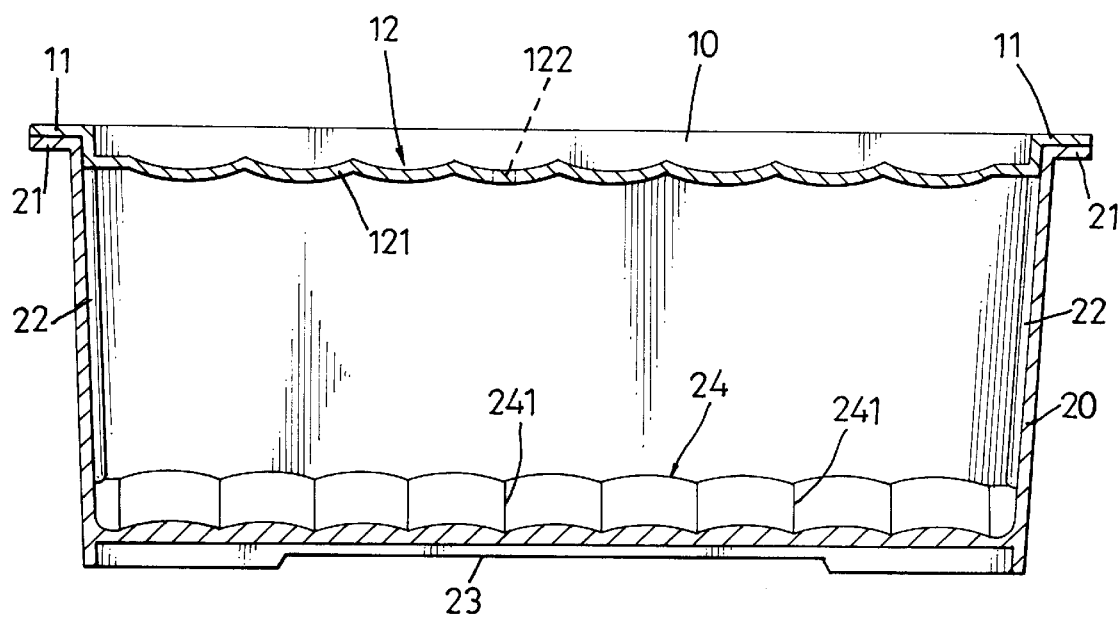
FIG. 4 is a schematic sectional view of the incubator showing an inner structure of the incubator.

Referring to FIG. 4, because of the undulated face 12 of the cover 10, vaporized water is able to accumulate in the consecutive ridges 121 and thus will eventually drop to the beveled bottom face 24 and then be directed toward the opening 23 to be drained via the troughs 241.

Therefore, the idea of the invention is novel and the structure thereof also shows that the invention is practical.

From the foregoing, it is seen that the objects hereinbefore set forth may readily and efficiently be attained, and since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A nursery device comprising:
   a cover having:
      an undulated face provided with a through hole defined therein; and
      a first flange peripherally engaged with said undulated face; and
   an incubator having:
      a second peripheral flange corresponding to said first flange of said cover;
      a beveled bottom face provided with a wave-like shape and formed therein a plurality of consecutive troughs;
      four pairs of bars each formed in a side wall thereof and a slit defined between every two of said bars;
      two openings defined in opposed bottom edges thereof;
      two clapboards each provided with a plurality of indentations defined in a bottom edge thereof and corresponding to said troughs of said beveled bottom face; and
      a drainage hole communicating with said openings and defined in a predetermined position to drain the water within said incubator.

2. The nursery device as claimed in claim 1 further comprising a bolt inserted into said drainage hole and sequentially inserted into a washer having a diameter larger than that of said drainage hole, a spring having a diameter larger than that of said drainage hole, a stop securely positioned adjacent said drainage hole and defined therein a plurality of outlets communicating with said drainage hole and a block adjustably secured to a shank of said bolt and having a diameter larger than that of said drainage hole;
   said spring being positioned between said washer and said stop, said block being able to prevent water from flowing out from said drainage hole.

3. The nursery device as claimed in claim 1, wherein two cutouts are respectively defined in an opposed upper edge of said incubator.

\* \* \* \* \*